UNITED STATES PATENT OFFICE 2,529,194

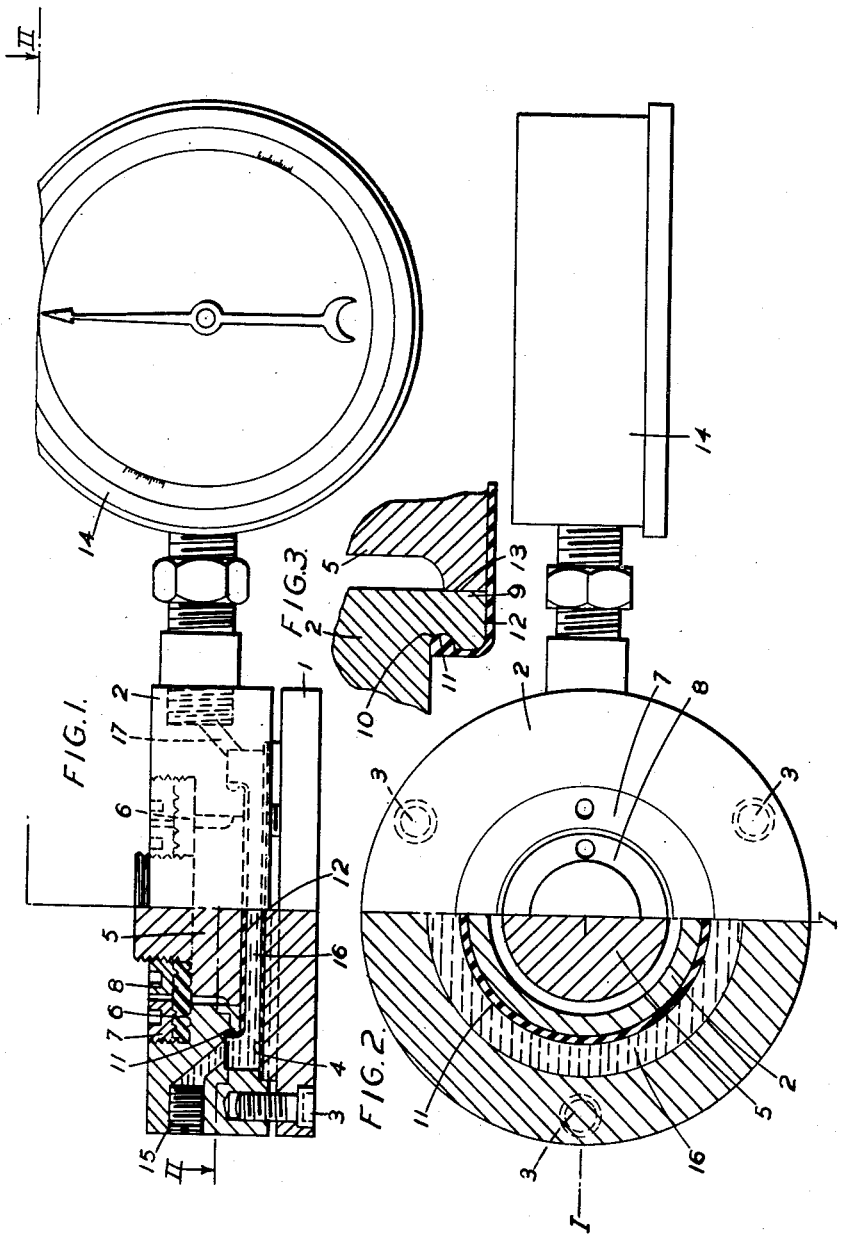

HYDROSTATIC SCALE

Frank Stanley Saunders, Keynsham, near Bath, England

Application July 5, 1946, Serial No. 681,551
In Great Britain May 29, 1946

1 Claim. (Cl. 265—47)

This invention relates to hydrostatic weighing machines and is a modification of the invention described and claimed in the specification to my prior Patent No. 2,392,702 and it has for its object to simplify the construction of the machine therein described. Another object is to provide a hydrostatic weighing machine of relatively little structural height. Further objects and various aspects of the invention will become apparent from the following description of a typical hydrostatic weighing machine according to the invention and from the appended claim.

In the accompanying drawing which illustrates an embodiment of this invention—

Figure 1 is an elevation partly in section on line I—I of Figure 2,

Figure 2 is a plan partly in section on line II—II of Figure 1, and,

Figure 3 is a sectional view drawn to an enlarged scale, of a detail of construction.

In the embodiment illustrated in the drawing the machine comprises a body element constituted by a base element 1, and an upper or cover element 2 secured to the element 1 by a plurality of bolts 3 and forming, jointly with the said base element, a receptacle for a body of a liquid, a washer 4 being interposed between the two elements for making a liquid tight joint between the two parts. A plunger or piston element 5 is centralised and supported by an indiarubber ring 6 locked in position relatively to the cover member 2 by an annular ring nut 7 and relatively to the plunger element 5 by an annular ring nut 8. The cover member 2 is furnished with an annular projection 9 such projection being provided with an annular groove 10 arranged to receive the beaded edge 11 formed on an elastic diaphragm 12 of rubber or other suitable material shaped to cover and enclose the lower end of the plunger element 5 and the annular projection 9 which latter constitutes a guide for the lower enlarged end 13 of the plunger element 5.

The receptacle is provided with a gauge of any suitable type such for example as a gauge of the Bourdon type, the tube of which is provided with a bleed screw for the purpose of ensuring that all air is entirely removed from the system.

Assuming the machine has been assembled in the manner illustrated in the drawing, to prepare same for use it is essential to ensure that all air is entirely removed from all those parts of the device in which liquid is to be contained and to enable this to be effected a plug 15 provided in the cover element 2 is removed and the bleed screw at the end of the gauge tube is slackened and liquid is then slowly poured into the aperture and into the space 16 and to enable the liquid to pass more readily through the passage 17 and into the gauge tube, the machine may be tilted, the liquid driving any air that may be in the system through the bleed screw until said liquid begins to pass through, the bleed screw is then nearly closed, the machine topped up and the sealing plug 15 is then inserted and screwed into position after which the bleed screw is fully tightened up, or, alternatively before topping up the bleed screw is fully tightened and after topping and the screwing in of the sealing plug 15 which action sets up a pressure in the machine which will be indicated on the dial, the bleed screw is opened to permit excess of liquid to pass away and when the needle has returned to zero point the bleed screw is again tightened up.

To allow for expansion and contraction of the fluid in the space 16 and gauge tube, the gauge may be furnished with an adjustable zero point, that is, the dial may be arranged for adjustment relatively to the needle.

What I claim is:

A hydrostatic weighing machine which comprises, in combination: a base element; a cover element secured to said base element and defining therewith a receptacle for an incompressible fluid between said two elements, said cover element being formed with a central aperture constituting a plunger guide therein; a plunger element having a limited vertical sliding movement with respect to said cover element positioned in said aperture therein; means for centralizing and supporting said plunger element in said cover element, said means including an india-rubber ring and a pair of annular ring nuts locking said india-rubber ring relatively to said cover element and said plunger element respectively; an annular projection on the inner end of said cover element; a flexible diaphragm embracing the inner end of said annular projection, said flexible diaphragm being retained on said annular projection by its own elasticity; and means for enabling fluid pressures developed within said receptacle between said base element and said cover element to be read externally thereof.

FRANK STANLEY SAUNDERS.

REFERENCES CITED

The following references are of record in the file of this patent:

UNITED STATES PATENTS

| Number | Name | Date |
|---|---|---|
| 1,023,154 | Kenerson | Apr. 16, 1912 |
| 1,580,430 | Gaines | Apr. 13, 1926 |
| 2,125,483 | Blanchard | Aug. 2, 1938 |
| 2,392,702 | Saunders | Jan. 8, 1946 |